Figure 1:
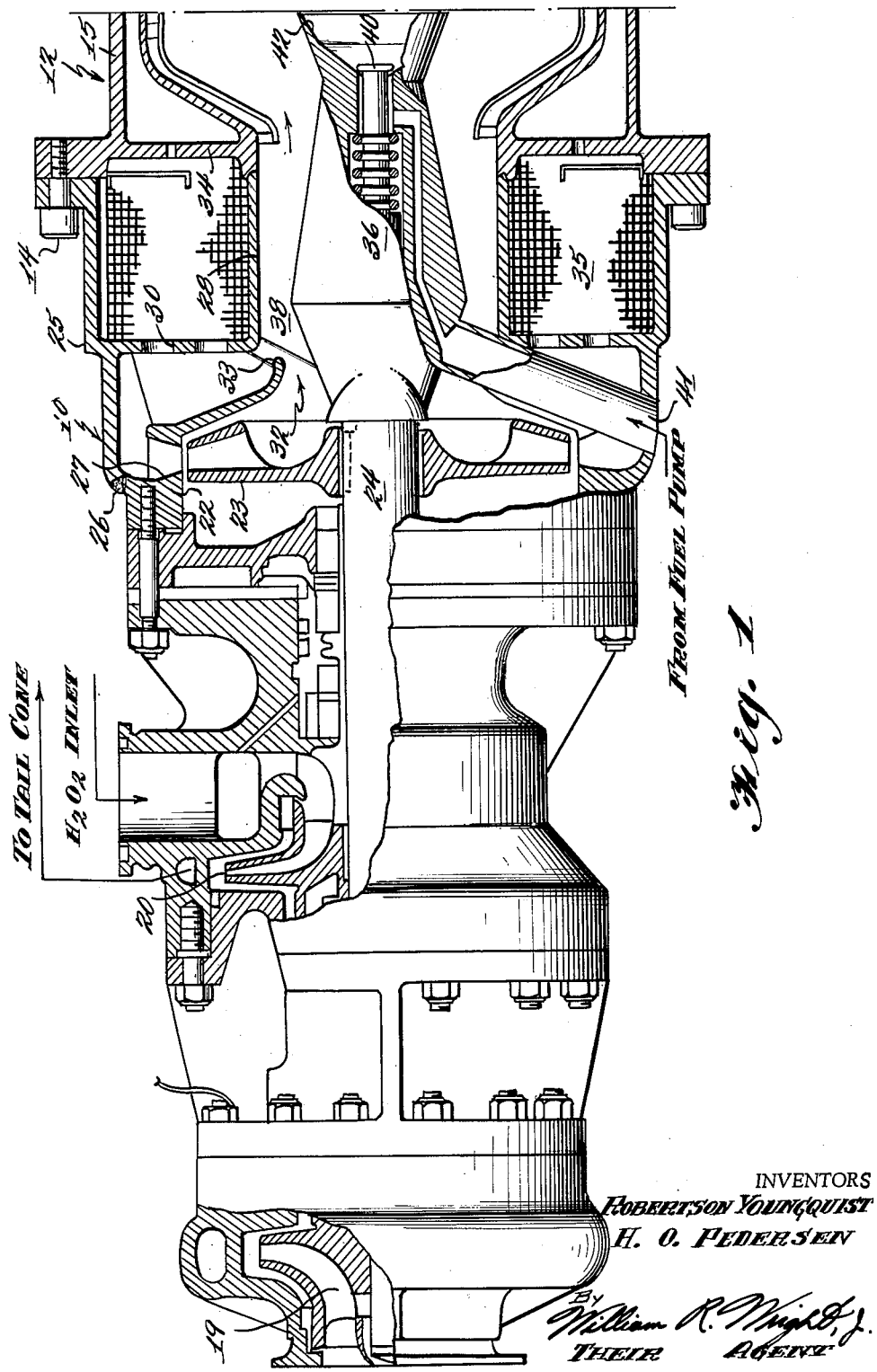

INVENTORS
ROBERTSON YOUNGQUIST
H. O. PEDERSEN
BY William R. Wright Jr.
THEIR AGENT

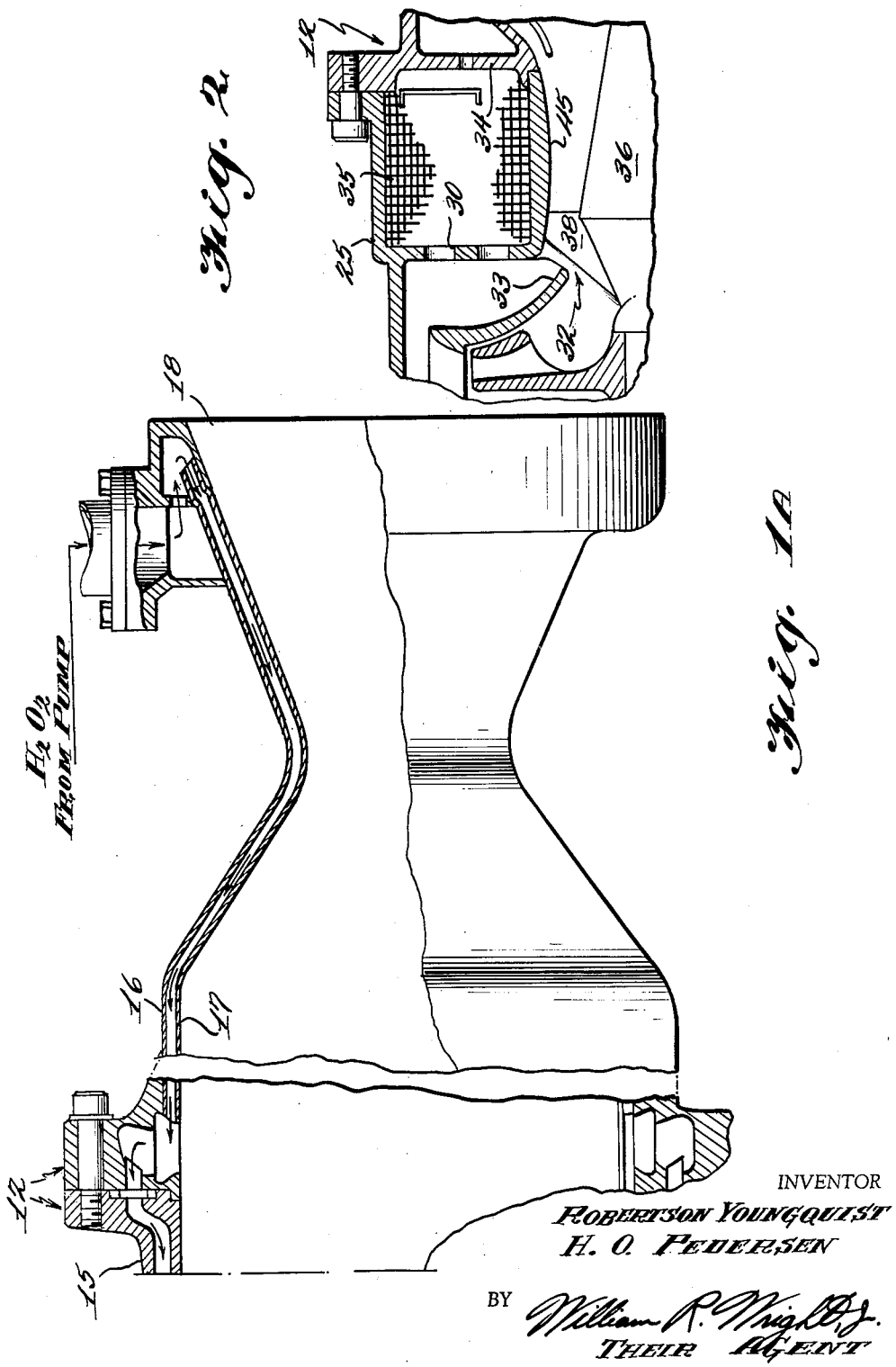

United States Patent Office 3,091,921
Patented June 4, 1963

3,091,921
TURBOROCKET POWERPLANT INCLUDING TURBINE BYPASSING MEANS FOR A PORTION OF THE PROPELLANT
Robertson Youngquist, Morristown, and Haakon O. Pedersen, Morris Plains, N.J., assignors, by mesne assignments, to Thiokol Chemical Corporation, a corporation of Delaware
Filed June 24, 1957, Ser. No. 668,279
1 Claim. (Cl. 60—35.6)

This invention relates generally to rocket powerplants and more particularly to an improved turborocket powerplant for use as the sole propulsion of an aircraft or missile, or as a booster.

Powerplants of this general type are known in the art but are extremely limited as to practical use due to such objectionable characteristics as excessive weight of the powerplant; excessive airframe space requirements and difficulty of mounting the powerplant therein; impractical correlation and design of tankage, turbines, propellant pumps and other major components; etc. resulting in inefficient operation and difficulty of access to the components for maintenance, etc.

Accordingly, the chief object of the present invention is to provide an improved turborocket powerplant of super-performance which will obviate the above and other disadvantages characteristic of known prior art structures.

An important object of the present invention is to provide an improved turborocket powerplant embodying substantial design refinements and improved arrangement of its major components so as to result in a maximum of coordination and cooperation therebetween to effect a superperformance thereof.

Another important object of the present invention is to provide a turborocket powerplant having major and minor component units or assemblies so relatively arranged as to enable the ready assembly or disassembly thereof for repair, maintenance, or replacement with a minimum of time and effort.

A further important object of the present invention is to provide an improved turborocket powerplant having a novel, compact, axial arrangement of its major components resulting in a minimum of airframe space requirements and enhancing the mounting and servicing of the powerplant in an aircraft.

A still further important object of the present invention is to provide an improved turborocket powerplant having liquid oxidizer and fuel as propellants and embodying major components so arranged as to effect a thorough decomposition of $H_2O_2$ and a maximum agitation of the resulting gases just prior to the injection of fuel therein.

Other objects and advantages of the invention will become apparent during the course of the following description.

In the drawings we have shown one embodiment of the invention. In this showing:

FIGURES 1 and 1A are a central, longitudinal sectional view, partly in elevation of the turborocket engine comprising the present invention; and FIGURE 2 is a fragmentary, detail view showing another form of the catalyst chamber wherein the inner wall defining the bore is of aerofoil cross-section.

In its broadest aspects, the present invention contemplates a variable thrust turborocket propulsion system for the high altitude superperformance of piloted aircraft or missiles having an integrated turborocket powerplant and hydrogen peroxide upstream components characterized by a gas generator design for pressurized or turbopump operation which includes an integral, radial turbine wheel nozzle block, an uncooled adapter, a long "sonic choke" to thrust chamber transition designed for an integral "spaghetti" chamber, and a fuel injector mounted in the bore of the choke.

In general, the turborocket powerplant comprising the present invention is supplied with 90% hydrogen peroxide which flows from a boost pump through the turbopumps, valving and thrust chamber cooling jacket to a silver screen catalyst bed where it is completely decomposed. The decomposition products flow through and power a single stage impulse turbine directly connected to the propellant pumps. Since only a portion of this flow is required for power generation, some of it bypasses the turbine and rejoins the turbine drive gases in the turbine exhaust duct before entering the fuel injection and combustion chamber regions.

In the turbine exhaust duct, the hydrogen peroxide decomposition products pass through a "sonic choke." The local sonic velocity produced by the configuration isolates the turbine section from chamber pressure variations thereby limiting the energy transmitted to the turbine wheel and preventing turbopump overspeed. Passing from the "sonic choke" region, the oxygen rich decomposition products enter the thrust chamber where JP–5 fuel is injected and burned to release additional energy for propulsive thrust.

Referring to the drawings, the turborocket powerplant comprising the present invention includes an upstream turbopump section 10 and a downstream thrust chamber section 12 which are axially aligned and retained in fluid tight longitudinal abutment by means of bolts 14 joining the casing section flanges. The section 12 includes a short injector chamber and combustion section 15 including $H_2O_2$ passages and an aft section secured thereto forming the thrust chamber 16 which comprises a combustion chamber terminating in a jet nozzle.

The thrust chamber is preferably of the flanged "spaghetti" type and forms the subject matter of another application for Letters Patent. It comprises a multiple stainless steel coolant tube bundle with the tubes tangent to one another throughout the entire length of the thrust chamber and is provided with a ceramic lining 17. The tube cross-sectional areas are round in the throat region and flattened to an elliptical shape in the chamber and nozzle exit cone regions. The individual tubes are preformed by a swaging process. The chamber 16 is regeneratively cooled by $H_2O_2$ passing forwardly through the tubes, as indicated by the arrows, from a manifold integral with the tail cone 18 which is supplied by the oxidant pump to be described.

The upstream section 10 of the powerplant houses the turbopump which is an integral subassembly thereof and consists of a pair of spaced centrifugal, impeller type pumps 19 and 20 and a turbine 23 spaced rearwardly therefrom on the end of a common shaft 24 upon which all are mounted. Hydrogen peroxide decomposition products expanded through subsonic nozzles and directed into the turbine blades, provide the drive as will be described.

While the compact and axial arrangement of the above components of the turbopump and their cooperation with other components of the powerplant are an important feature of the present invention, the refined design of the associated elements such as fuel cooling of the shaft 24, fuel lubricating of the bearing, steam seal, heat shield, seal case, and modified turbine wheel, form only an incidental part of the present invention and hence are not specifically described.

Another integral subassembly of the upstream section 10 of the powerplant comprises the gas generator casing 25 which is welded to the casing 10 as at 26 and surrounds the turbine inlet nozzles 27 formed in the integral wheel nozzle block 22. A rearwardly open annular catalyst chamber having a flat, inner annular wall 28 is formed integral with the casing 25 and its forward wall 29 is apertured as at 30 to permit the generated gases to pass to the turbine 23 and through its bypass.

The fixed turbine nozzle plate has a rearwardly extending, generally conical portion 32 which is spaced from and cooperates with the catalyst chamber to define the annular bypass 33 for a portion of the gases generated in the chamber which contains a silver screen catalyst 35 and is closed at its rear by the annular, multi-holed plate oxidizer injector 34 formed integral with the front end of the downstream casing section 15 when it is bolted to the upstream section 10.

A single annular nozzle or choke 36 is mounted centrally within the bore of the gas generator or catalyst chamber by means of circumferentially spaced vanes 38 engaging the chamber wall 28. The outer configuration of the nozzle 36 as shown produces a venturi effect with the chamber wall 28 to produce local sonic velocity in the throat and subsonic velocity in the exit under bipropellant operating conditions.

A fuel injector valve 40 forming the subject matter of another application for Letters Patent is located within the pintle of the "sonic" choke 36 and is designed as generally shown, to inject fuel into the hydrogen peroxide decomposition products passing axially through the bore from the turbine 23 and the bypass 33 from a recessed deflector 42 which directs a fuel spray at an axial angle of 20° in the downstream end of the choke 36. It is to be noted that there is thus embodied a long sonic choke-to-thrust chamber transition. The valve 40 is a poppet valve actuated by fuel injection pressure, a loss of which will cause the valve to close.

The operation of the improved powerplant comprising the present invention based on a "topping turbine" principle is as follows:

The powerplant per se is, of course, a part of a complete propulsion system involving oxidizer supply system components, control equipment relating to the fuel supply system components, fuel and oxidizer tanks, and cockpit controls and instrumentation in addition to the powerplant propellant valves, control components, lines, wiring, vents and drains as well as a control box assembly and powerplant control box wiring harness.

The oxidizer supply system components include one or more boost pumps (a slight pressurization of the hydrogen peroxide tankage is required to assure adequate suppression head at the boost pump inlets during high altitude flights), tank safety valve, jettison valve, flow totalizer, pressurizing valve, and nitrogen pressure regulators.

In the operation of the powerplant, hydrogen peroxide flows from the turbopump 20 through a line to the manifold in the tail cone 18 where it flows through the thrust chamber tubes which are thus regeneratively cooled. This cooling with the hydrogen peroxide rather than the fuel, heats the former and facilitates its decomposition.

The hydrogen peroxide flows axially upstream through the tubes of the thrust chamber 16, the aligned passages in the section 15 and through the multi-holed plate oxidizer injector 34 into the catalyst chamber where it is completely decomposed into gases (steam and oxygen) by the silver screen catalyst 35. The generated gases pass axially upstream through the apertures 30 of the forward catalyst chamber wall 29 to the fixed turbine nozzles 27 in the integral wheel nozzle block 22 and radially inward to the single stage impulse turbine 23.

The volume of gases generated is such that only a portion thereof is required for driving the hydrogen peroxide pump 20 and the fuel pump 19 and the balance passes between the turbine housing portion 32 and the wall 29 and out of the bypass 33.

The flow of gases axially out of the turbine 23 in a downstream direction through the bore of the gas generator defined by its inner wall 28 is joined by the axially directed flow of bypassed gases to effect a turbulence which enhances the mixture of injected fuel therewith as the gases emerge from the bore into the thrust chamber 16. The fuel is, of course, supplied under pressure from the fuel pump 19 by a line to the fuel valve 40 by an inlet pipe 41.

The configuration of the sonic choke 36 effects a sonic or above velocity of the gases through the bore 28 of the generator and a subsonic velocity as they emerge into the fuel injection and combustion chamber region. The sonic or above velocity isolates the turbine 23 from chamber pressure variations and back flow of gases and also limits the energy transmitted to the turbine wheel and prevents overspeeding of the turbopump as a whole. Such overspeeding can only occur upon a sudden pressure decrease downstream of the turbine, and as the established sonic choke maintains the back pressure on the turbine constant, there can be no material pressure drop to effect overspeeding. The machine is so designed and constructed that only the proper amount of decomposed gases can flow to the turbine because of the baffle means.

The spraying of JP-5 fuel through the valve 40 as directed by the deflector 42 into the subsonic flow of gases entering the thrust chamber 15—16, enriches the oxygen rich decomposition products and the burning of the mixture releases additional energy for propulsive thrust.

As shown in the modification of FIGURE 2, the inner wall 45 of the catalyst chamber which defines the bore in which the choke is mounted, is aerofoil in cross-section to effect a supersonic flow of gases therethrough.

From the foregoing description of the powerplant forming the present invention, it will be seen that a novel, compact arrangement thereof has been effected comprising two main readily connectible assemblies and certain integral subassemblies which, together with the various component parts thereof, so cooperate as to produce a highly improved structure and operation thereof not hitherto known characterized by greater efficiency and maintenance free life, a greater ease in assembly and disassembly for maintenance, materially lesser weight, and a minimum of airframe space requirements.

It is to be understood that the forms of our invention herewith shown and described are to be taken as preferred examples of the same and that various changes in the shape, size and arrangement of parts may be resorted to without departure from the spirit of the invention or the scope of the subjoined claim.

We claim:

A rocket powerplant utilizing a liquid oxidizer and a liquid fuel as propellants comprising an elongated casing having a pair of disconnectible sections, one of said sections including a thrust chamber having axially extending coolant passages formed in its walls, a catalyst chamber including a catalyst formed at the rear end of said other section and communicating with said passages, means mounted in said other section for forcing the oxidizer through said passages into said catalyst chamber to effect the decomposition thereof into gases prior to its entry into the thrust chamber, said catalyst chamber comprising an annulus whose bore has one end defining the entrance to said thrust chamber to direct gases axially therewithin, said catalyst chamber communicating with an adjoining chamber open to the other end of said bore, and means in said adjoining chamber to separate and rejoin the flow of gases to said bore to effect a turbulent flow therethrough, said last-mentioned means comprising a baffle for directing a portion of said gases in a turbine bypassing path to said bore.

References Cited in the file of this patent

UNITED STATES PATENTS

| | | |
|---|---|---|
| 2,689,454 | Schneider | Sept. 21, 1954 |
| 2,711,629 | Schapker | June 28, 1955 |
| 2,763,126 | Halford et al. | Sept. 18, 1956 |

FOREIGN PATENTS

| | | |
|---|---|---|
| 702,779 | Great Britain | Jan. 20, 1954 |
| 771,896 | Great Britain | Apr. 3, 1957 |